US009595076B2

(12) United States Patent
Fujiyama

(10) Patent No.: US 9,595,076 B2
(45) Date of Patent: Mar. 14, 2017

(54) PROGRAMMABLE DISPLAY CONFIGURED TO STORE SCREEN DATA FOR DEBUGGING INTO VOLATILE MEMORY

(71) Applicant: Mitsubishi Electric Corporation, Tokyo (JP)

(72) Inventor: Hiroaki Fujiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/771,223

(22) PCT Filed: May 8, 2013

(86) PCT No.: PCT/JP2013/062911
§ 371 (c)(1),
(2) Date: Aug. 28, 2015

(87) PCT Pub. No.: WO2014/181395
PCT Pub. Date: Nov. 13, 2014

(65) Prior Publication Data
US 2016/0005144 A1    Jan. 7, 2016

(51) Int. Cl.
*G06F 11/36* (2006.01)
*G05B 19/05* (2006.01)
*G06T 1/60* (2006.01)
*G06F 12/06* (2006.01)
*G09G 5/00* (2006.01)
*G06F 3/14* (2006.01)
*G06F 11/32* (2006.01)
*G06F 11/28* (2006.01)

(52) U.S. Cl.
CPC ............... *G06T 1/60* (2013.01); *G05B 19/05* (2013.01); *G06F 3/1423* (2013.01); *G06F 11/32* (2013.01);
(Continued)

(58) Field of Classification Search
None
See application file for complete search history.

(56) References Cited

U.S. PATENT DOCUMENTS

| 6,766,510 | B2 | 7/2004 | Takeda |
| 2002/0032902 | A1 | 3/2002 | Takeda |
| 2002/0178405 | A1* | 11/2002 | McCullough et al. ............ G06F 11/3466 714/45 |
| 2010/0325409 | A1* | 12/2010 | Kim et al. ............ G06F 9/4401 713/2 |

(Continued)

FOREIGN PATENT DOCUMENTS

| CN | 1383509 A | 12/2002 |
| JP | 59-111501 A | 6/1984 |

(Continued)

OTHER PUBLICATIONS

Taiwanese Office Action for TW 102143201 dated Apr. 22, 2015.
(Continued)

*Primary Examiner* — Joni Richer
(74) *Attorney, Agent, or Firm* — Sughrue Mion, PLLC; Richard C. Turner

(57) ABSTRACT

A programmable display includes a display, a volatile memory, a nonvolatile memory that stores control screen data containing screen data, and a controller that loads the control screen data from the nonvolatile memory into the volatile memory at startup and displays a screen on the display on the basis of control screen data loaded into the volatile memory. The controller has a function to store the control screen data received from a screen data creation device in the nonvolatile memory and a function to store the control screen data received from the screen data creation device directly in the volatile memory.

1 Claim, 6 Drawing Sheets

(52) U.S. Cl.
CPC .......... *G06F 11/36* (2013.01); *G06F 11/3648* (2013.01); *G06F 12/0638* (2013.01); *G09G 5/00* (2013.01); *G05B 2219/13142* (2013.01); *G06F 11/28* (2013.01); *G06F 2212/205* (2013.01); *G09G 2330/026* (2013.01)

(56) References Cited

U.S. PATENT DOCUMENTS

| | | | |
|---|---|---|---|
| 2012/0239918 A1* | 9/2012 | Huang | G06F 9/4401 713/2 |
| 2014/0223571 A1 | 8/2014 | Koara | |

FOREIGN PATENT DOCUMENTS

| | | | |
|---|---|---|---|
| JP | 59-149509 A | 8/1984 | |
| JP | 60-258604 A | 12/1985 | |
| JP | 6-274434 A | 9/1994 | |
| JP | 8-249016 A | 9/1996 | |
| JP | 9-62537 A | 3/1997 | |
| JP | 10-69303 A | 3/1998 | |
| JP | 2002-63046 A | 2/2002 | |
| JP | 2007-179112 A | 7/2007 | |
| JP | 2012-27639 A | 2/2012 | |
| TW | 201312309 A1 | 3/2013 | |
| WO | 2012/093418 A1 | 7/2012 | |

OTHER PUBLICATIONS

International Search Report for PCT/JP2013/062911 dated Aug. 6, 2013.
Communication dated Jun. 12, 2016, issued by the State Intellectual Property Office of the P.R.C. in corresponding Chinese Application No. 201380076418.4.

* cited by examiner

PROGRAMMABLE DISPLAY CONFIGURED TO STORE SCREEN DATA FOR DEBUGGING INTO VOLATILE MEMORY

CROSS REFERENCE TO RELATED APPLICATIONS

This application is a National Stage of International Application No. PCT/JP2013/062911 filed May 8, 2013, the contents of all of which are incorporated herein by reference in their entirety.

FIELD

The present invention relates to a programmable display that is connected to a control device and has a function to display information on the control device and to perform setting for the control device.

BACKGROUND

A programmable display includes an interface with a control device, such as a programmable logic controller (PLC), and can display a state of the control device connected thereto via the interface and receive control instructions for the control device through a screen.

Such a programmable display allows its user to create screen data tailored to the units of a device to be controlled in order to display the state of the control device, in any manner by using screen creating software or the like. The user creates the screen data with components and drawing functions provided by the screen creating software.

Control screen data created by using the screen creating software is transferred from the screen creating software to the programmable display and stored in a nonvolatile memory of the programmable display. The programmable display operates with the control screen data stored in the nonvolatile memory.

To quicken actions when active, the programmable display uses a mechanism to load the control screen data stored in the nonvolatile memory into a volatile memory, in which input/output (I/O) is processed quickly, at startup of the programmable display, and to operate with the control screen data in the volatile memory after the startup.

When it is necessary to modify the screen data for reasons such as debugging of the screen data, the screen data is modified with the screen creating software, and the modified screen data is transferred to the nonvolatile memory of the programmable display. Because of the use of the mechanism described above, the action of the modified screen data is verified after the modified screen data is loaded into the volatile memory from the nonvolatile memory at startup of the programmable display.

In Patent Literature 1, a technique is disclosed that aims at debugging screen data without transferring the screen data to a programmable display.

CITATION LIST

Patent Literature

Patent Literature 1: Japanese Patent Application Laid-Open No. 2007-179112

SUMMARY

Technical Problem

During debugging of screen data, it is necessary to verify whether the screen data achieves desired actions of displaying/operation. It is possible to verify the actions of the screen data simply with the function of the screen creating software to simulate the screen data without transferring the screen data to the programmable display. However, actions resulting from the function to simulate the screen data and actions resulting from the execution with the screen data transferred to the programmable display may differ from each other in some cases; thus, the verification of the actions on the programmable display is indispensable to confirm that the programmable display operates correctly.

If an error is found as the result of the verification of the actions of displaying/operation of the programmable display, the screen data is edited again with the screen creating software to correct the error. The screen data is then transferred again to the programmable display to verify the actions of displaying/operation by the screen data. Since debugging involves a series of tasks as described above, the debugging takes a great amount of time if it is necessary to repeat such tasks more than once to correct the error. Writing the screen data in the nonvolatile memory of the programmable display and loading the screen data into the volatile memory from the nonvolatile memory take relatively long time in particular and thus become major factors in increasing the time until the entire programmable display is re-started. Hence, repeating the tasks described above reduces the efficiency of debugging.

While Patent Literature 1 aims at debugging screen data without transferring the screen data to the programmable display, it requires a screen retention device during the debugging to retain temporarily retained screen data and ordinary screen data, which are created with the screen creating software. In other words, the technique disclosed in Patent Literature 1 allows no debugging to be performed unless the programmable display is connected to a screen data creation device.

The present invention has been achieved in view of the above, and it is an object of the present invention to provide a programmable display that eliminates the need to load screen data for use in debugging into a volatile memory from a nonvolatile memory and enables the debugging of the screen data to be performed with a screen data creation device disconnected.

Solution to Problem

In order to solve the above problems and achieve the object, an aspect of the present invention is a programmable display including a display; a volatile memory; a nonvolatile memory that stores control screen data containing screen data; and a controller that loads the control screen data from the nonvolatile memory into the volatile memory at startup and displays a screen on the display on a basis of the control screen data loaded into the volatile memory, wherein the controller has a function to store control screen data received from a screen data creation device in the nonvolatile memory and a function to store control screen data received from the screen data creation device directly in the volatile memory.

Advantageous Effects of Invention

A programmable display according to the present invention eliminates the need to store screen data in a nonvolatile memory of the programmable display for debugging of the screen data and thereby negates the need for time to write the screen data in the nonvolatile memory when the screen data is transferred and time to read the screen data from the nonvolatile memory at startup of the programmable display, producing an effect of enabling reduction in time taken for the debugging.

DESCRIPTION OF EMBODIMENTS

Embodiments of a programmable display according to the present invention will be described in detail below with reference to the drawings. The present invention is not limited to the embodiments.

Embodiment

Figure 1:
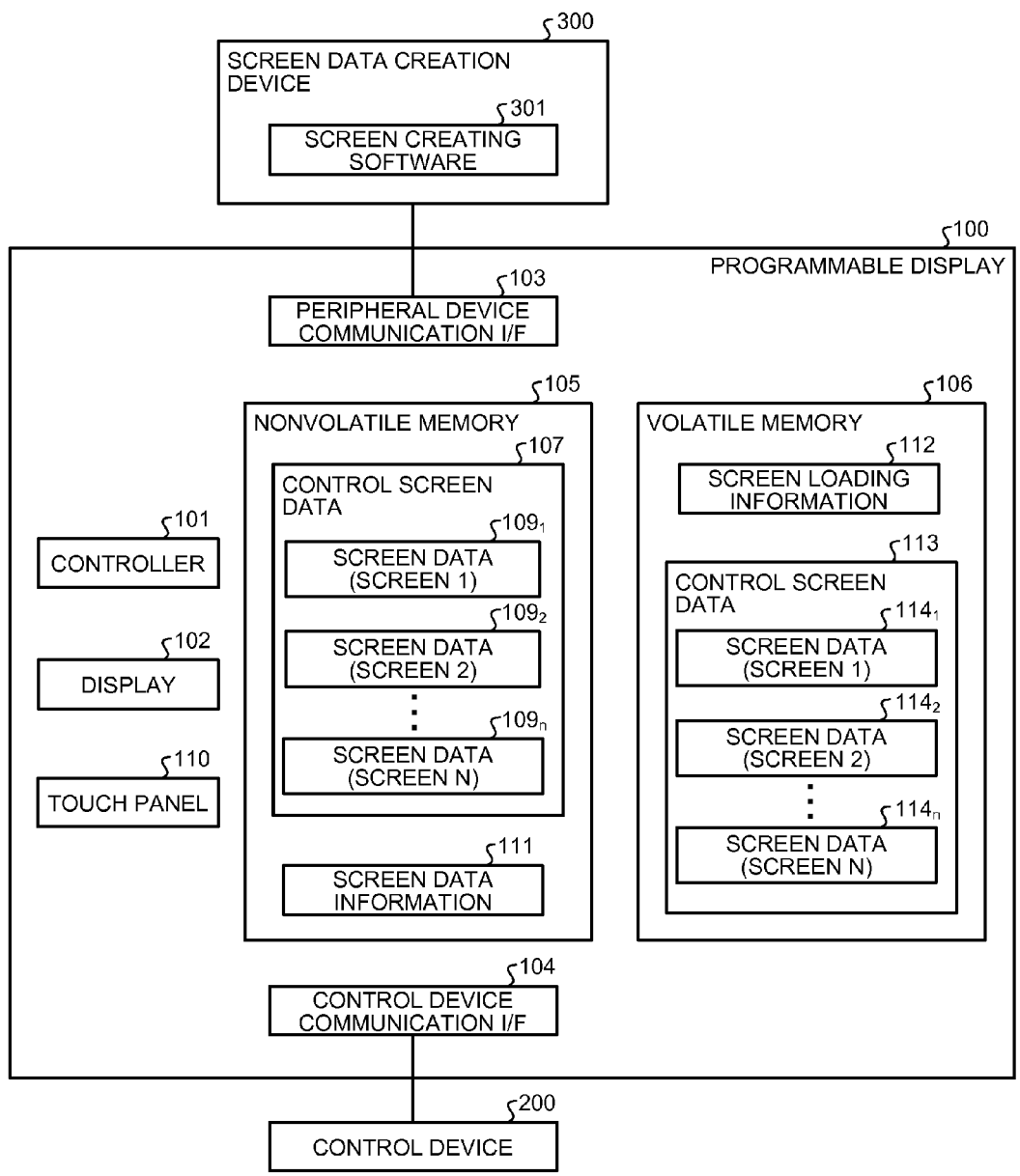
FIG. 1 is a diagram illustrating a configuration of a programmable display according to an embodiment of the present invention.

FIG. 1 is a diagram illustrating a configuration of a programmable display according to an embodiment of the present invention. A programmable display 100 is connected to a control device 200, such as a PLC, and displays the state of the control device 200. Control screen data 107 indicative of the state of the control device 200 is created by using screen creating software 301 in a screen data creation device 300 connected to the programmable display 100.

The programmable display 100 includes a controller 101, a display 102 as a display, a peripheral device communication interface (I/F) 103, a control device communication I/F 104, a nonvolatile memory 105, a volatile memory 106, and a touch panel 110 as an operation unit. The controller 101 has a function to determine whether control screen data received from the screen data creation device 300 is ordinary control screen data or control screen data for use in debugging. Ordinary control screen data and control screen data for use in debugging can be optionally distinguished from each other in such a way that an identifier indicative of being ordinary or for use in debugging is included in a header of the control screen data transmitted to the programmable display 100 and or that a flag indicative of being ordinary or for use in debugging together is transmitted to the programmable display 100 together with the control screen data.

In response to the reception of ordinary control screen data created in the screen data creation device 300 through the peripheral device communication I/F 103, the controller 101 stores, as the control screen data 107, the received ordinary control screen data in the nonvolatile memory 105. The controller 101 also creates screen data information 111 and stores it in the nonvolatile memory 105. The screen data information 111 represents information for determining which address of the nonvolatile memory 105 data is to be read from and how large the data is (its size) when the control screen data 107 at startup of the programmable display 100 is loaded.

The control screen data 107 is configured by multiple screen data. It is assumed here that the control screen data 107 is configured by screen data $109_1$ to $109_n$ for screens 1 to N. It is also assumed that the screen data information 111 defines the storage addresses and storage sizes of the screen data $109_1$ to $109_n$ on the nonvolatile memory 105.

In response to the reception of control screen data for use in debugging created in the screen data creation device 300 through the peripheral device communication I/F 103, the controller 101 stores, as control screen data 113, the received control screen data for use in debugging in the volatile memory 106. The controller 101 also creates screen loading information 112 and stores it in the volatile memory 106. The screen loading information 112 represents information for determining which address of the volatile memory 106 data is to be read from and how large the data is (its size) when the controller 101 executes screen switching. The screen switching will be described hereinafter.

The controller 101 also creates the screen loading information 112 and stores it in the volatile memory 106 when the control screen data 107 stored in the nonvolatile memory 105 is loaded into the volatile memory 106 as the control screen data 113.

Thus, either the control screen data loaded by the controller 101 at startup of the programmable display 100 or the control screen data for use in debugging received from the screen data creation device 300 is stored in the volatile memory 106. The screen loading information 112 created by the controller 101 is also stored in the volatile memory 106 either when the controller 101 loads the control screen data 107 into the volatile memory 106 or when the controller 101 stores the control screen data for use in debugging in the volatile memory 106. The control screen data 113 is configured by screen data $114_1$ to $114_n$ for screens 1 to N in a manner similar to those of the control screen data 107.

Figure 2:
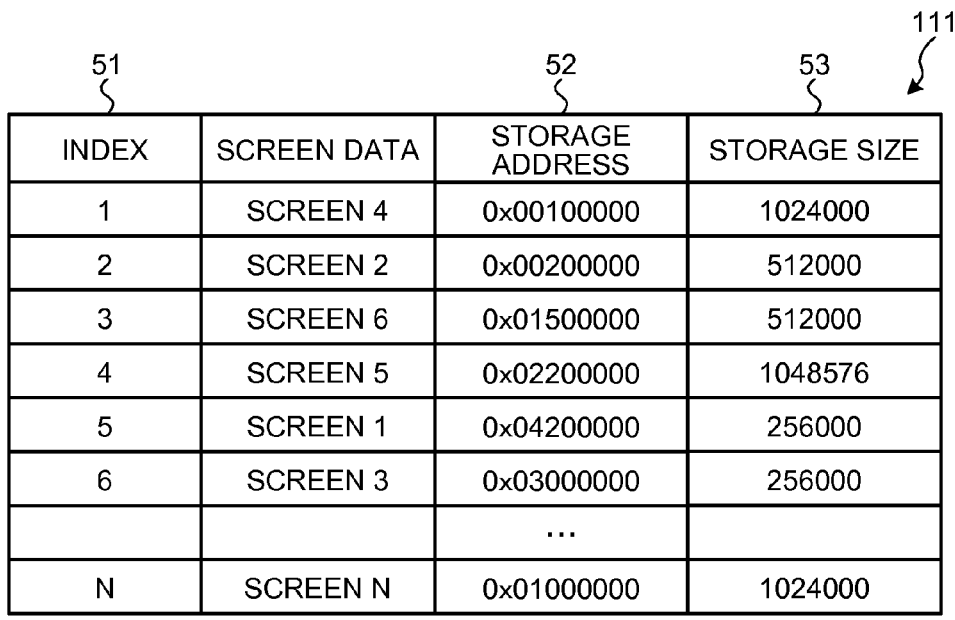
FIG. 2 is a diagram illustrating the structure of screen data information.

FIG. 2 is a diagram illustrating the structure of the screen data information. The screen data information 111 is structured as a table having rows the number of which is the same as the number of screens in the control screen data 107 and the screen data information 111 has information on an index 51, a storage address 52, and a storage size 53 for each screen. These pieces of information are used when the controller 101 loads the control screen data 107 into the volatile memory 106 at startup of the programmable display 100. More specifically, the controller 101 reads data by the storage size 53, as the data for one screen, from the storage address 52 in the nonvolatile memory 105 and loads the data into the volatile memory 106. For example, in a case of the data for the screen 4 having the index 51 of 1, the controller 101 reads data by "1024000" bytes, as the data for the one screen, from the address "0x00100000" in the nonvolatile memory 105 and stores the data in the volatile memory 106.

Figure 3:
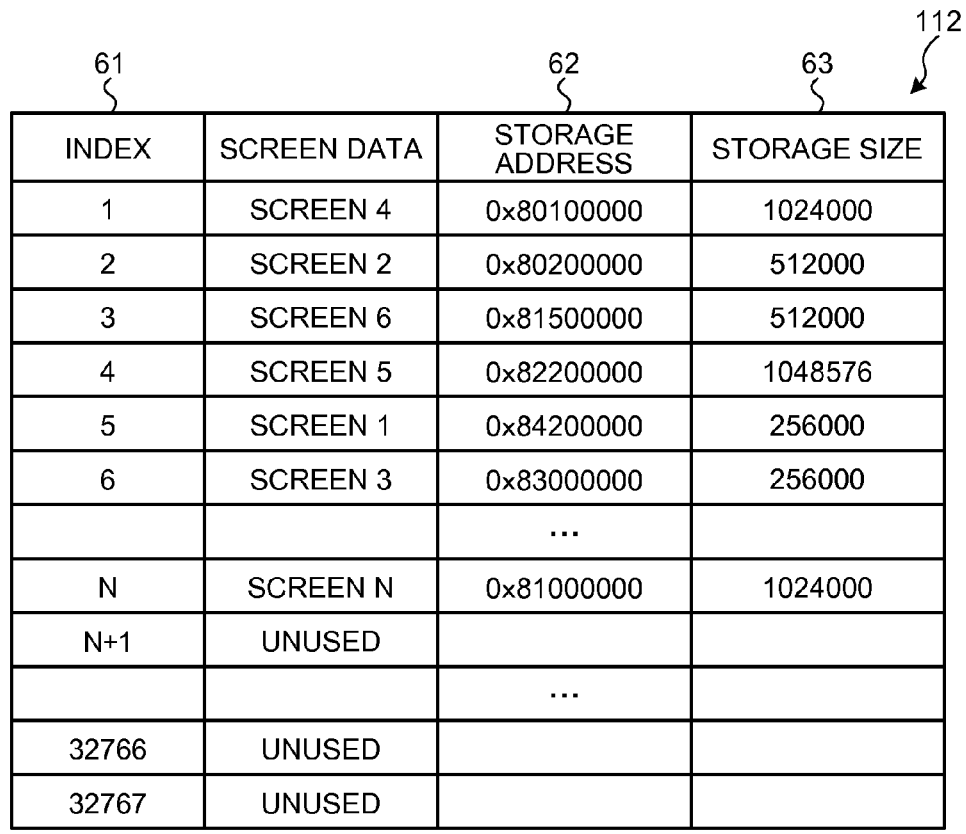
FIG. 3 is a diagram illustrating the structure of screen loading information.

FIG. 3 is a diagram illustrating the structure of the screen loading information. At startup of the programmable display 100, the screen loading information 112 is structured as a table having rows the number of which is the same as the maximum number of screens specified for the screen data $109_1$ to $109_n$. The screen loading information 112 represents information of an index 61, a storage address 62, and a storage size 63 for each screen. FIG. 3 illustrates an example having the maximum number of screens at 32767. The screen loading information 112 is used when the controller 101 displays a screen on the display 102. More specifically, when the controller 101 changes screens on the display 102 so as to switch the screens and the like, the controller 101 reads data by the storage size 63, as the data for one screen, from the storage address 62 in the volatile memory 106 on the basis of the screen loading information 112 and performs processing to display the data on the display 102. For example, in a case of the data of the screen 4 having the index 61 of 1, the controller 101 reads data by "1024000" bytes, as the data for the one screen, from the address "0x80100000" in the volatile memory 106 and performs the processing to display the data on the display 102.

Figure 4:
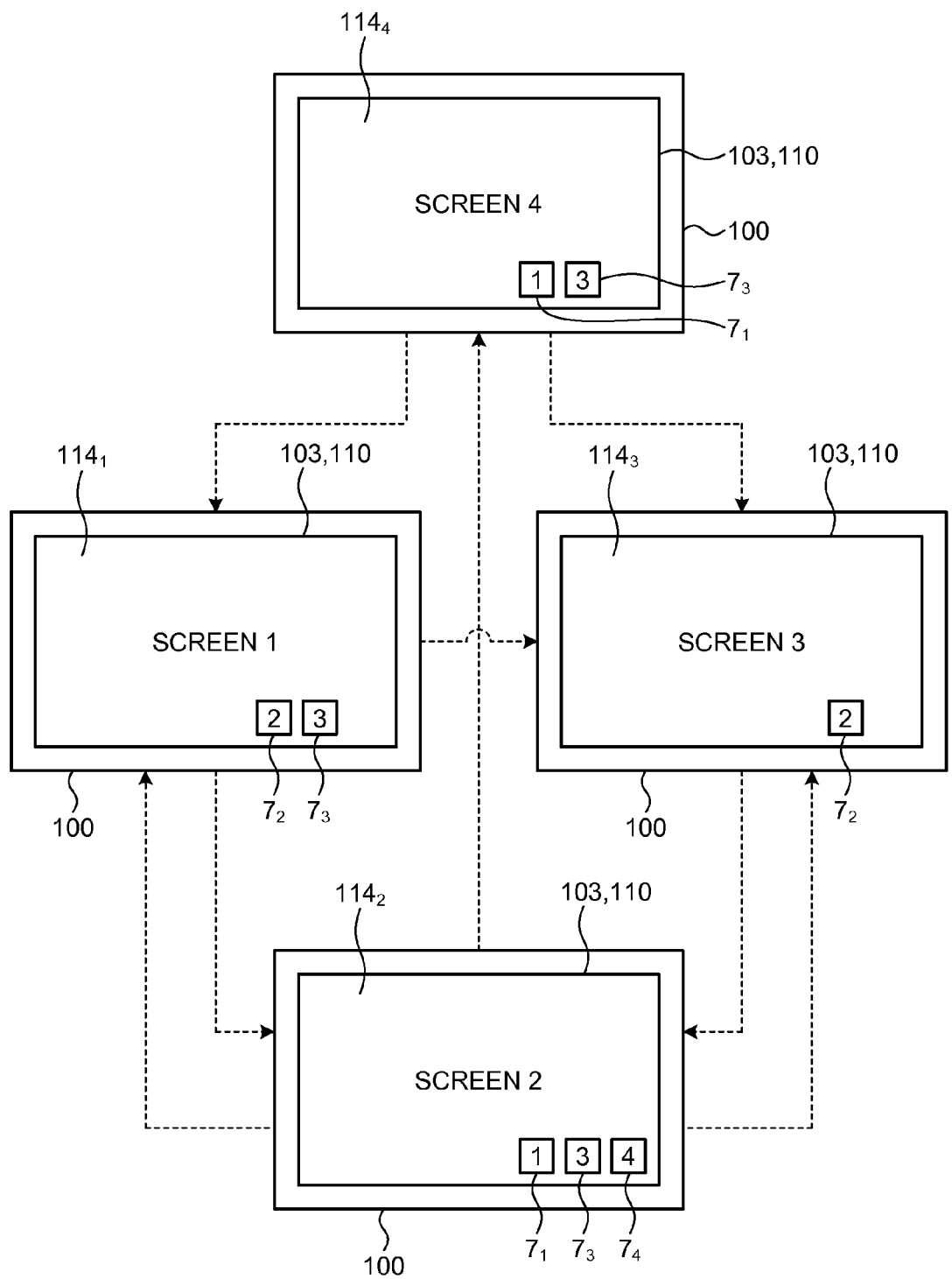
FIG. 4 is a diagram illustrating an example relationship between pieces of screen data contained in control screen data.

FIG. 4 is a diagram illustrating an example relationship between the pieces of screen data contained in the control screen data. In this example, the number of screens is four (N=4). The screens (the screens 1 to 4) corresponding to the data $114_1$ to $114_4$ are selectively displayed on the display 102 by the controller 101. Screen selector switches $7_1$ to $7_4$ are arranged on the screens. The screen selector switches $7_1$ to $7_4$ are switches for switching to the screens 1 to 4, respectively. When a user touches a region on the display 102 where the screen selector switches $7_1$ to $7_4$ are displayed, the touch panel 110 detects the pressing of the switch, so that the controller 101 displays on the display 102 a screen that corresponds to the one of the pieces of data $114_1$ to $114_4$ on the basis of the detection result of the touch panel 110. In FIG. 4, the switching relations of the screens are indicated with arrows. For example, the arrow from the screen 4 to the screen 1 indicates that the screen on the display 102 can be switched from the screen 4 to the screen 1 when the screen selector switch $7_1$ on the screen 4 is pressed.

Note that the switch for switching a screen to be displayed on the display 102 to a destination screen is not limited to such screen selector switches $7_1$ to $7_4$ where the destination screen is fixed. A switch for dynamically changing a destination screen may be used. For example, a switch to return to the previous screen (to switch to original screen) may be provided. When such a switch is pressed, the destination screen may be dynamically changed in accordance with which screen the current screen has been switched from.

Figure 5:
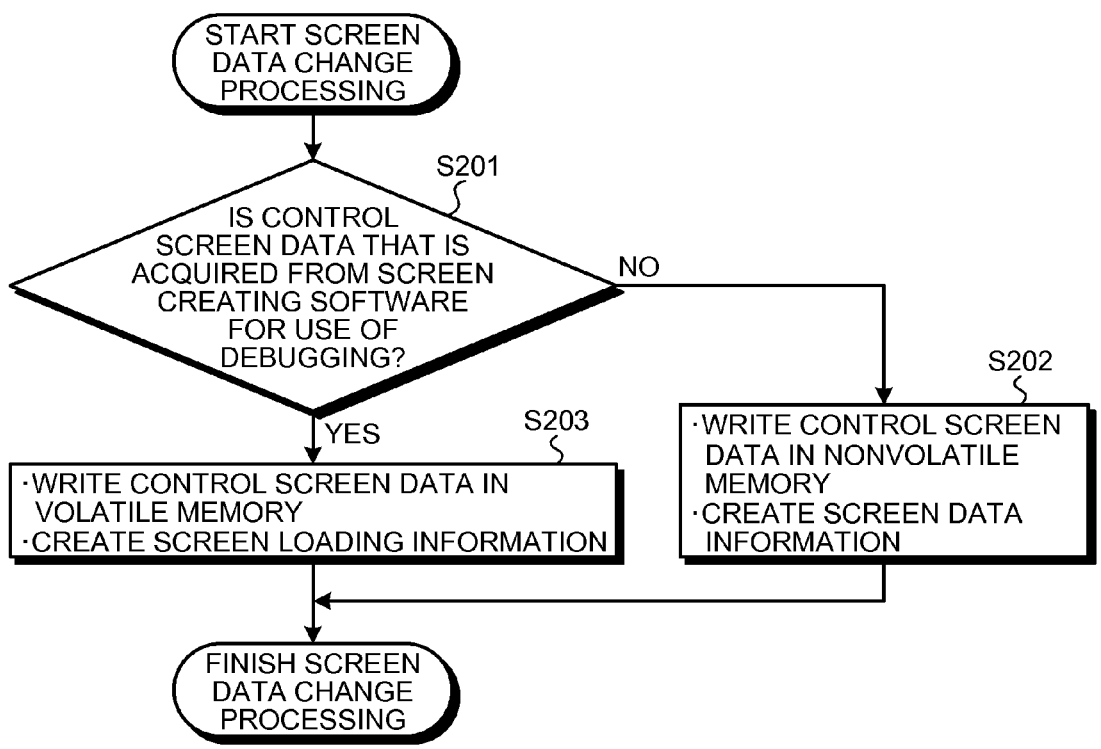
FIG. 5 is a flowchart relating to update processing on the screen data in a volatile memory of the programmable display according to the embodiment.

FIG. 5 is a flowchart relating to update processing on the control screen data in the volatile memory of the programmable display according to the embodiment. In response to the reception of the control screen data from the screen data creation device 300 through the peripheral device communication I/F 103, the controller 101 determines whether the data is ordinary control screen data or control screen data for use in debugging (step S201). If the received control screen data is ordinary control screen data (step S201/No), then the controller 101 stores the received control screen data in the nonvolatile memory 105 and creates the screen data information 111 (step S202) to end the processing. If the received control screen data is screen data for use in debugging (step S201/Yes), then the controller 101 stores the received control screen data in the volatile memory 106 and creates the screen loading information 112 (step S203). The processing to update the screen loading information 112 will be described hereinafter. The controller 101 displays a changed screen on the display 102 on the basis of the control screen data 113 stored in the volatile memory 106.

When the control screen data for use in debugging received from the screen data creation device 300 has been stored in the volatile memory 106, the control screen data 107 stored in the nonvolatile memory 105 is different from the control screen data 113 stored in the volatile memory 106. This poses no problem because the programmable display 100 according to the embodiment operates by referring only to the volatile memory 106. Additionally, since the programmable display 100 is not turned off while debugging is performed, it is not required that the control screen data 107 is stored in the nonvolatile memory 105.

Figure 6:
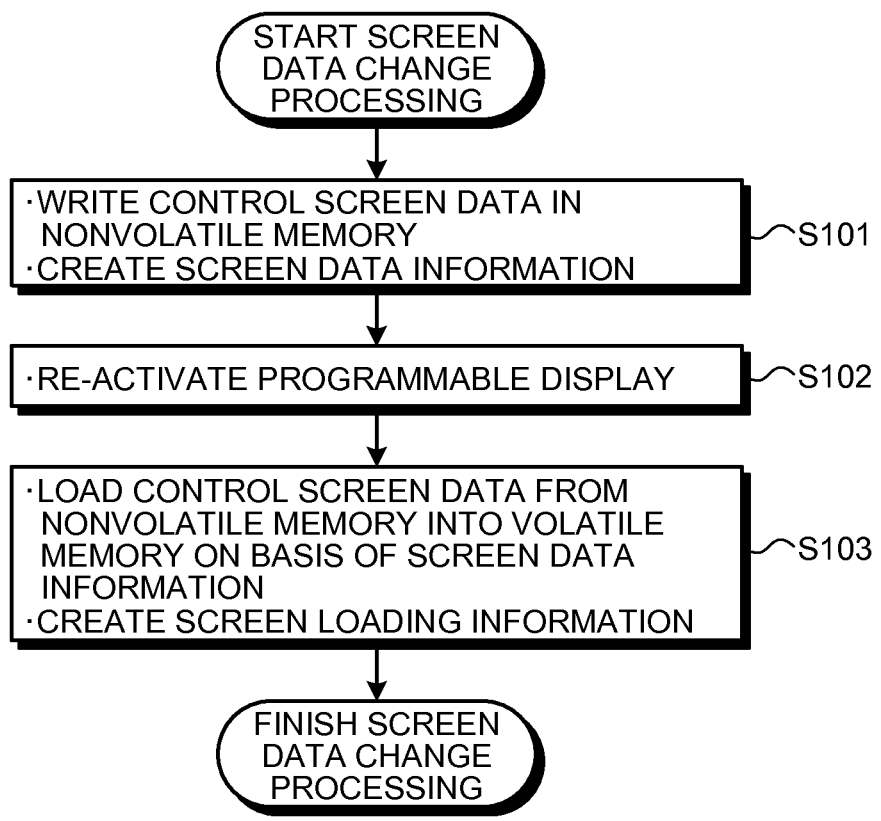
FIG. 6 is a flowchart relating to update processing on screen data for use in debugging in a programmable display that transfers the screen data to a nonvolatile memory for debugging.

For comparison, screen update processing will now be described in a programmable display that stores control screen data for use in debugging, which is received from a screen data creation device, in a nonvolatile memory. FIG. 6 is a flowchart relating to update processing on control screen data for use in debugging in a programmable display that transfers the control screen data to a nonvolatile memory for debugging. A controller of the programmable display writes control screen data for use in debugging, which is acquired from a screen creating software through a peripheral device communication I/F, in a nonvolatile memory. In this case, the controller of the programmable display creates screen data information (step S101). When the control screen data for use in debugging has been written in the nonvolatile memory, the controller re-starts the programmable display (step S102). After re-starting, the controller of the programmable display loads the control screen data from the nonvolatile memory into a volatile memory on the basis of the screen data information and creates screen loading information (step S103). The controller of the programmable display displays on a display a screen that corresponds to the control screen data for use in debugging on the basis of the control screen data loaded in the volatile memory.

Figure 7:
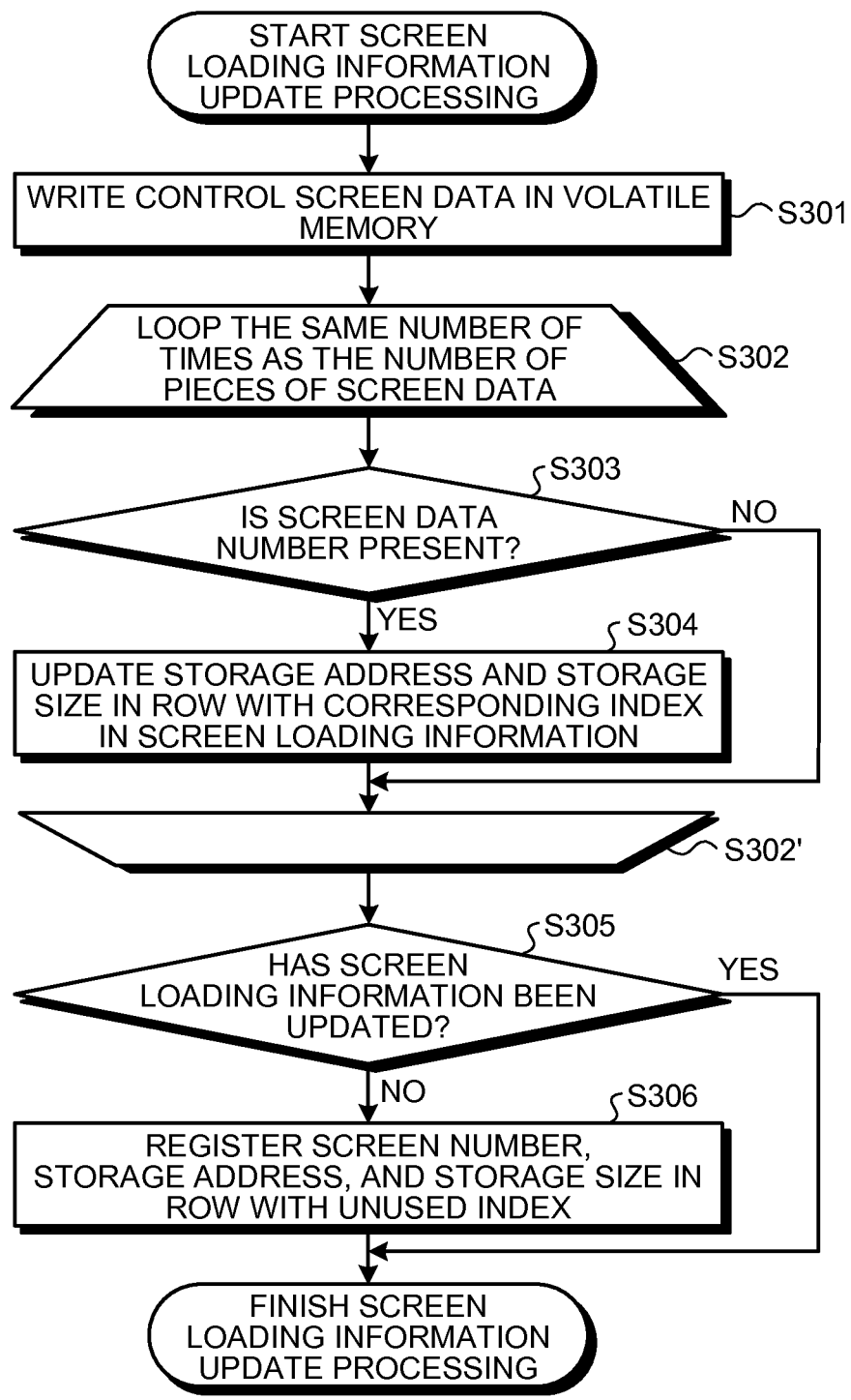
FIG. 7 is a flowchart of update processing on the screen loading information.

FIG. 7 is a flowchart of update processing on the screen loading information. The controller 101 stores, as the control screen data 113, control screen data for use in debugging, which is received from the screen data creation device 300 through the peripheral device communication I/F 103, in the volatile memory 106 (step S301). The controller 101 then starts loop processing the same number of times as the number of pieces of the data in the control screen data 113 (steps S302 to S302'). If the screen number for the changed screen data acquired from the screen creating software 301 is present in the screen loading information 112 (step S303/Yes), then the storage address and the storage size in the corresponding row of the index are updated (step S304). If the screen number for the changed screen data acquired from the screen creating software 301 is not present in the screen loading information 112 (step S303/No), neither storage address nor storage size is updated. After the processing from steps S303 to S304 is repeated the same number of times as the number of pieces of the data in the control screen data 113, the controller 101 verifies whether the screen loading information 112 has been updated (step S305). If the screen loading information 112 has not been updated (step S305/No), then the storage address and the storage size are stored for an unused index (step S306). If the screen loading information 112 has been updated (step S305/Yes), then the processing ends. Through the processes described above, if the screen number corresponding to the changed screen is present in the screen loading information 112, then the storage address and the storage size in the corresponding row of the index are updated. If the screen number corresponding to the changed screen is not present in the screen loading information 112, then the storage address and the storage size are stored in a row of an unused index. When the changed control screen data has been stored as the control screen data 113 in the volatile memory 106, the programmable display 100 operates on the basis of the changed control screen data 113.

According to the present embodiment, the programmable display 100 for constituting a system can refer to the changed control screen data 113 without writing or reading the control screen data 107 stored in the nonvolatile memory 105, and thus the time required for debugging can be reduced.

Additionally, after the control screen data for use in debugging is received from the screen data creation device 300, the debugging work with the programmable display 100 may be performed independent of the screen data creation device 300. Therefore, the debugging work can be performed in a condition close to the actual environment.

INDUSTRIAL APPLICABILITY

As described above, the programmable display according to the present invention is suitable to reduce the waiting time until a changed screen is displayed when control screen data is transferred to the programmable display during debugging of the control screen data, especially in the case of a significant amount of screen change.

REFERENCE SIGNS LIST $7_1$ to $7_4$ screen selector switch, 51, 61 index, 52, 62 storage address, 53, 63 storage size, 100 programmable display, 101 controller, 102 display, 103 peripheral device communication I/F, 104 control device communication I/F, 105 nonvolatile memory, 106 volatile memory, 107, 113 control screen data, $109_1$ to $109_n$, $114_1$ to $114_n$ screen data, 110 touch panel, 111 screen data information, 112 screen loading information, 200 control device, 300 screen data creation device, 301 screen creating software.

The invention claimed is:

1. A programmable display comprising:
a display;
a volatile memory;
a nonvolatile memory configured to store control screen data received from a screen data creation device, the control screen data containing a plurality of pieces of screen data; and
a controller configured to load the control screen data from the nonvolatile memory into the volatile memory at startup and selectively display a screen corresponding to any one of the plurality of pieces of screen data on the display on a basis of the control screen data loaded into the volatile memory, wherein
the controller is further configured to determine whether the control screen data is for debugging based on information included in the control screen data;
in response to determining, based on the information, that the control screen data received from the screen data creation device is not for debugging, the controller stores the received control screen data in the nonvolatile memory, and
in response to determining, based on the information, that the control screen data received from the screen data creation device is for debugging, the controller loads the plurality of pieces of screen data contained in the received control screen data into the volatile memory and stores the received control screen data directly in the volatile memory.

* * * * *